Oct. 17, 1950     O. H. SMITH ET AL     2,525,966
TREATMENT OF EXPANDED ARTICLES
Filed May 19, 1948
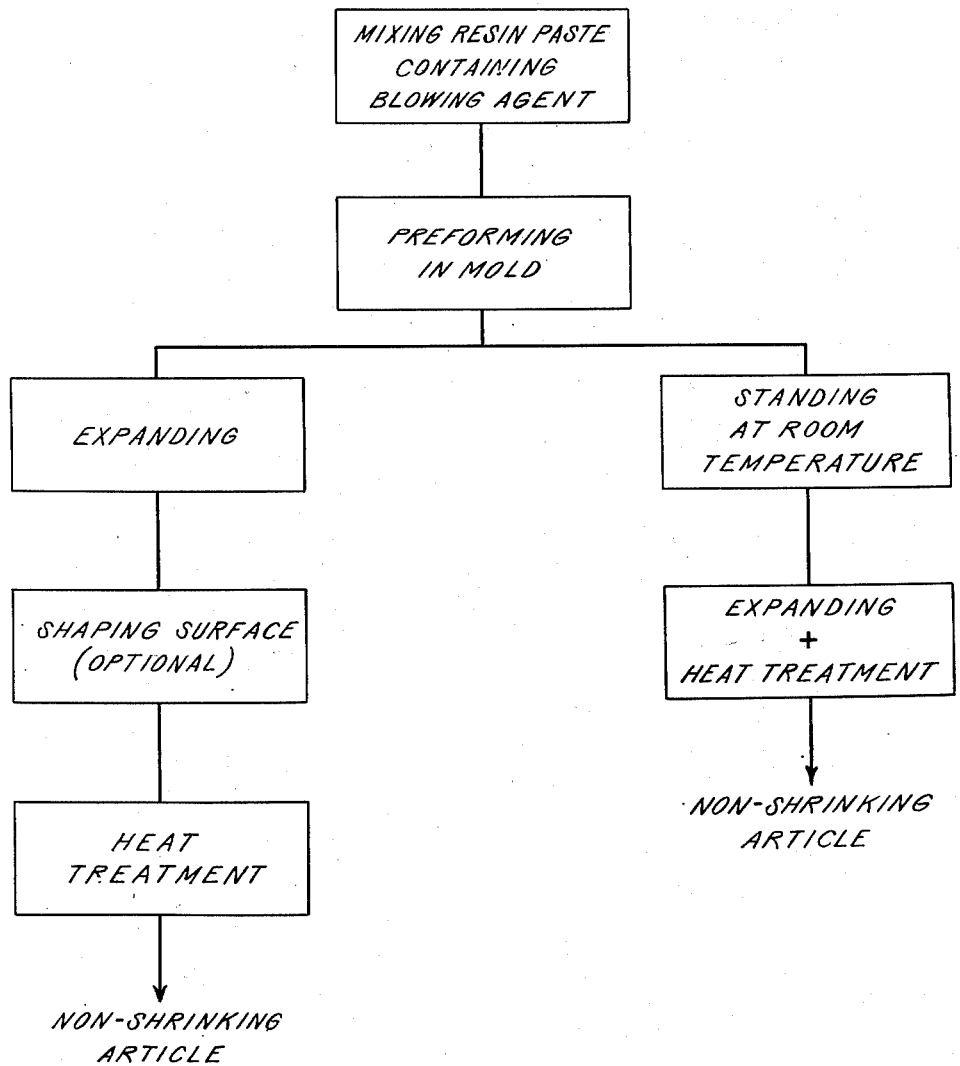
INVENTORS
OMAR H. SMITH
PAUL G. ROACH
BY
Robert J. Patterson
ATTORNEY Patented Oct. 17, 1950

2,525,966

UNITED STATES PATENT OFFICE 2,525,966

TREATMENT OF EXPANDED ARTICLES

Omar H. Smith, West Englewood, and Paul G. Roach, Hawthorne, N. J., assignors to United States Rubber Company, New York, N. Y., a corporation of New Jersey Application May 19, 1948, Serial No. 27,863

4 Claims. (Cl. 18—48)

This invention relates to the heat treatment of articles of closed-cell expanded thermoplastic polyvinyl chloride resins to prevent shrinkage thereof upon storage. Shrinkage after fabrication of closed-cell expanded articles made from plastisols of polyvinyl chloride has been a major problem. For example, expanded polyvinyl chloride practice golf balls made by substantially filling a mold cavity with a mixture of particulate polyvinyl chloride and a plasticizer therefor of such a type and in such an amount as to convert the polyvinyl chloride to a gel upon heating, together with a suitable chemical blowing agent, heating the mixture in the mold to simultaneously effect generation of gas by the blowing agent and formation of the gel, then cooling the molded article, removing it from the mold and subsequently heating it outside the mold to expand it to the final shape and size, have exhibited an undesirable tendency to shrink with passage of time. For instance, a practice golf ball made in this manner may decrease in diameter by 20% over a period of three or four months' storage.

We have now found that the dimensions of shaped articles of closed-cell expanded thermoplastic polyvinyl chloride resins can be stabilized (that is, the tendency to shrink in storage or upon the passage of time can be almost entirely or completely eliminated) by subjecting the expanded articles to an elevated temperature in a fluid medium in which the article is free to expand further, for a period of time just sufficient to substantially permanently fix the dimensions.

In applying our invention to closed-cell expanded articles made from plasticized polyvinyl chloride compositions made as described above, the expanded articles are heated at a temperature of at least 90° C. and not higher than 115° C., preferably at 95°–100° C., for a period of time governed by the temperature selected and ranging from 10 minutes at the higher temperature limit (115° C.), to from 60 to 80 minutes at the lower temperature limit (90° C.). The time should be roughly inversely proportional to the temperature within the limits given. Thus the heating period may range from 10 to 80 minutes but in no event should the time exceed substantially that required to substantially permanently fix the dimensions of the article. The exact length of time also depends in part upon the size of the article because that affects the length of time required for the heat applied to diffuse throughout the expanded article. Heat treatment of closed-cell expanded plasticized polyvinyl chloride articles at temperatures substantially above 115° C., or for too long a period within the effective temperature range, is undesirable because it will cause an objectionable loss of gas from the cells of the expanded material, particularly the outer cells, resulting in a flabby, "orange peel" surface, and may cause actual collapse of the thermoplastic cellular structure.

On the other hand, temperatures lower than 90° C. are not effective to eliminate the tendency of such closed-cell expanded plasticized polyvinyl chloride compositions to shrink, regardless of the duration of the treatment, and may also result in deflation of the article. Thus, the operation of heating the pre-formed molded article outside the mold to expand it to final shape and size, which is preferably carried out at a temperature below 90° C., viz., not over 85° C., in order to avoid the formation of splits on the surface of the article, is not effective to eliminate the shrinking tendency, even if it is prolonged for a time greater than that necessary to effect expansion by the blowing gas. However, we have found that if the pre-formed article is first permitted to stand at room temperature, i. e., at not over 25° C., for at least one hour, say two hours, after it is removed from the pre-forming mold, the expansion of the article may be carried out at a higher temperature, i. e., at a temperature of at least 90° C., e. g., 95° C., without splitting the surface. In such cases, the heating process of the present invention is conveniently combined with the expansion step by subjecting the article to the expansion temperature for a substantially longer time than is required to simply effect expansion, i. e., for a time sufficiently long to substantially permanently set the dimensions of the article, a suitable period being from 20 to 40 minutes.

When it is desired to produce an article having an uneven or irregular surface, that is, with elevations and/or depressions therein, such as relief, embossing, lettering, dimpling, etc., whether or not such indentations or other features are impressed in the form of a regular pattern or design, such indentations, dimples, etc., may be impressed in miniature during the pre-forming molding operation by employing a pre-forming mold having corresponding miniature surface projections or depressions on the wall of the mold cavity, or, full-sized indentations may be impressed on the surface after the expanding operation by placing the smooth, expanded article in a mold cavity having suitable full-sized surface projections, and heating under slight pressure. The heat treatment of the present invention may thereafter be applied to the resulting article.

The heat-treating step of our invention may be effected by any convenient means—for example, by immersing the article of closed-cell expanded plasticized polyvinyl chloride in warm water or by placing it in a heated oven. Under such conditions the article is free to expand in the fluid medium. For purposes of this invention the article should not be confined in a mold while it is being heat-treated, because under such confinement the tendency to shrink is retained if the article is cooled before removal from the mold. If the article is not cooled it is badly torn and distorted by the too rapid expansion when the mold is opened.

Any suitable blowing agent may be used in practicing our invention, preference being given to those which generate nitrogen, since nitrogen gas, because of the large proportion of nitrogen in the outside air, does not leak out of the cells after the pressure in the cells is reduced to atmospheric. An excellent blowing agent is alpha, alpha'-azobisisobutyronitrile. Other nitrogen-producing blowing agents such as diazoaminobenzene, 1,3 - bis(o - xenyl)triazene, 1,3-bis(p-xenyl)triazene, etc. may be used.

Any plasticizer may be employed which is capable of dissolving the particles of the resin upon heating to form a gel. Examples are di-(2-ethylhexyl) phthalate, tricresyl phosphate, and dibutyl phthalate, and other high-boiling esters and ethers known to the industry may be used. The quantity of the plasticizer should be sufficient to form a butter-like plastisol, or paste, and to give the desired gel which upon cooling forms a solid material. Usually from ½ to 2 parts of the plasticizer per one part of the polyvinyl chloride are employed. More commonly from 65 to 125 parts of the plasticizer per 100 parts of the polyvinyl chloride are used.

The proportion of the blowing agent employed will vary with the density and degree of cellularity desired in the final article and upon the particular blowing agent used. Generally from 8 to 40 parts, for example, of alpha, alpha'-azobisisobutyronitrile per 100 parts by weight of the resin are suitable.

The time and temperature of the molding operation will vary with the blowing agent employed, as will be understood by those skilled in the art. The temperature should be sufficiently elevated to both decompose the blowing agent and cause the plasticizer to dissolve the resin. When using the preferred blowing agent, alpha, alpha'-azobisisobutyronitrile, the pre-heating step may be carried out at a temperature of from 121° C. to 177° C. for from 6 to 15 minutes.

It is also advantageous to employ a small quantity of a heat or light stabilizer such as from 2 to 5 parts of calcium stearate per 100 parts of polyvinyl chloride.

The accompanying drawing, which is self-explanatory, shows that the cooled, pre-formed article may be treated in either of two ways to produce a closed-cell expanded article which is substantially free from any shrinking tendency. Thus, the pre-formed article may be expanded to the final shape and size whereupon if desired its surface may be dimpled or otherwise impressed with desired features, following which it may be stabilized by heat treatment in accordance with our invention. Alternatively, as shown in the right-hand portion of the drawing, the pre-formed article may be allowed to stand for a suitable length of time at room temperature after which it may be expanded and heat-treated in a single step.

The dimension-stabilizing heat-treating step of our invention is often most conveniently carried out by placing the closed-cell expanded polyvinyl chloride article under water at the desired temperature, the article being held under the surface of the water by suitable foraminous material which allows ready access of the water to the article. Instead of water any suitable heating medium may be employed. In many cases, the resulting article will be oversized, but upon cooling to room temperature and standing at room temperature for a short period of time, say two hours, it will attain its normal dimensions and will retain those dimensions within 1% during five weeks' storage.

Although the invention has been described with respect to stabilizing the dimensions of closed-cell expanded polyvinyl chloride articles which have been shaped by a particular molding process, the invention is not limited thereto. Any article of closed-cell expanded vinyl chloride resin, however produced, may be treated according to the present invention. For example, a closed-cell expanded article shaped by being cut or otherwise formed from previously expanded slabs, bars, tubes, or other stock closed-cell expanded polyvinyl chloride material may advantageously be subjected to our heat treatment for the purpose of setting the dimensions.

Following is a specific example which illustrates our invention in more detail.

Example I

This example illustrates the production of a practice golf ball from a paste of polyvinyl chloride, a plasticizer and a blowing agent.

A smooth spherical mold having a cavity of ¾ inch in diameter and split in the center is employed in the pre-forming operation. For dimpling, a pair of dimpled golf ball mold cups 1.68 inches in diameter is employed.

The following formula is employed:

| | Parts by weight |
|---|---|
| Polyvinyl chloride (100% polyvinyl chloride) | 100 |
| Calcium stearate | 3 |
| Tricresyl phosphate | 90 |
| Alpha,alpha'-azobisisobutyronitrile | 18 |

The polyvinyl chloride, calcium stearate and alpha,alpha'-azobisisobutyronitrile are dry mixed in a container equipped with paddles. After the powders are thoroughly mixed the plasticizer is stirred in; the mix at this point is still a relatively dry powder. It is transformed into a smooth paste or plastisol by passing it three to five times through a meat chopper. Both halves of the preforming mold are filled with the resulting plastisol, a slight excess being added to one half to insure a coherent ball being formed when the mold is closed. The filled and closed mold is heated eight minutes at a platen temperature of 165° C. (90 pounds steam) at a ram pressure of 3,600 pounds; it is then cooled seven minutes, and the mold is opened and the ball removed. The ball is noticeably larger than the mold cavity when removed, being about ⅞ inch in diameter. If removed warm the ball will expand so rapidly that it will be torn by the edge of the mold cavity.

Next, the ball is heated in water at 85° C. for 15 minutes, which expands it to golf ball size, i. e., to a diameter of approximately 1.68 inches. The ball is held under the water by a close-mesh wire screen.

The expanded ball is next dimpled in a pair of golf ball mold cups by heating twelve minutes at 110° C. (platen temperature), the hydraulic pressure applied to hold the mold cups together not exceeding 100 pounds per ball. High pressure in this operation can cause defective dimpling, the ball expanding enough to seal the mold at the joint before the air is expelled. The mold is cooled to room temperature before releasing hydraulic pressure.

In order to permanently fix the dimensions of the ball, it is now heated in water for thirty minutes at 98° C., being held under the water by a close-mesh wire screen. The ball is oversized when removed, i. e., about 2.00 inches in diameter, but attains normal dimensions, i. e., 1.70 inches in diameter, in approximately two hours at room temperature.

The ball thereafter retained its dimensions within 1% during five weeks' storage; in contrast, a similarly made ball which was not subjected to the dimension-stabilizing thermal treatment decreased 12% in diameter after five weeks' storage.

While our invention is often applied to expanded articles of straight polyvinyl chloride, it may be applied to expanded articles of resinous copolymers of vinyl chloride and vinyl acetate wherein the vinyl acetate varies from a trace up to 15% of the weight of vinyl chloride and vinyl acetate. Unless otherwise indicated, the term "polyvinyl chloride" as used in this specification and in the claims includes both 100% polyvinyl chloride and the copolymers just mentioned.

*Example II*

The following formula is employed:

|  | Parts by weight |
|---|---|
| Copolymer of vinyl chloride (95%) and vinyl acetate (5%) | 100 |
| Calcium stearate | 3 |
| Tricresyl phosphate | 90 |
| Alpha,alpha'-asobisisobutryonitrile | 19 |

The mixing, molding, expanding, dimpling and post-heating operations were carried out exactly according to the procedures outlined in Example I. Two balls whose dimensions were stabilized by heating in water 40' at 98° C. subsequent to dimpling did not shrink at all during 5 days' storage. Two similarly made balls which were not subjected to the dimension-stabilizing thermal treatment decreased 3.5% in diameter after 5 days' storage.

From the foregoing it will be seen that our invention provides a simple and practical method of eliminating the troublesome shrinkage of closed-cell expanded thermoplastic resinous articles, especially those made from a plastisol of polyvinyl chloride. The dimensional stabilization of the articles is obtained without the use of elaborate equipment or complicated technique. As a result of the use of invention, the production of expanded thermoplastic resinous articles is greatly facilitated. Numerous other advantages of our invention will be apparent from this disclosure to those skilled in the art.

Having thus described our invention, what we claim and desire to protect by Letters Patent is:

1. In a method of making closed-cell expanded plasticized polyvinyl chloride articles wherein a mold is substantially filled with a mixture comprising particulate polyvinyl chloride and a plasticizer therefor of such a type and in such amount as to convert said polyvinyl chloride to a gel upon heating, and a blowing agent, said mixture is preheated in the mold to effect generation of gas by the blowing agent and formation of said gel, and the molded article is subsequently heated outside the mold to expand it, the improvement which comprises thereafter heat treating the expanded article at a temperature of from 90° C. to 115° C. in a fluid medium in which it is free to expand, for only a sufficient time, equal to at least 10 minutes but not over 80 minutes, to substantially permanently fix the dimensions of the article.

2. In a method of making closed-cell expanded plasticized polyvinyl chloride articles wherein a mold is substantially filled with a mixture comprising particulate polyvinyl chloride and a plasticizer therefor of such a type and in such amount as to convert said polyvinyl chloride to a gel upon heating, and a blowing agent, said mixture is preheated in the mold to effect generation of gas by the blowing agent and formation of said gel, and the molded article is subsequently heated outside the mold to expand it, the improvement which comprises allowing the article to stand at a temperature of not over 25° C. for at least one hour after removing it from the mold and before carrying out said heating outside said mold to expand it, and subsequently carrying out said heating outside said mold by heating the article at a temperature of from 90° C. to 115° C. in a fluid medium in which it is free to expand, until it has expanded to final shape and thereafter continuing to heat the resulting article in said manner and at said temperature for a further time, equal to at least 10 minutes but not over 80 minutes, sufficient only to substantially permanently fix the dimensions of the resulting article.

3. In a method of making closed-cell expanded plasticized polyvinyl chloride articles wherein a mold is substantially filled with a mixture comprising particulate polyvinyl chloride and a plasticizer therefor of such a type and in such amount as to convert said polyvinyl chloride to a gel upon heating, and a blowing agent, said mixture is preheated in the mold to effect generation of gas by the blowing agent and formation of said gel and the molded article is subsequently heated outside the mold to expand it, the improvement which comprises immersing the expanded article in water at a temperature of from 95° C. to 100° C. while allowing said article freely to expand, for a period of time only sufficient to substantially permanently fix the dimensions of the article, said period of time ranging from 80 to 10 minutes.

4. A method of preventing shrinkage of a closed-cell expanded plasticized polyvinyl chloride article which normally shrinks on standing which comprises heat-treating the expanded article at a temperature of from 90° C. to 115° C. in a fluid medium in which it is free to expand, for a period of time only sufficient to substantially permanently fix the dimensions of the article, said period of time ranging from 80 to 10 minutes.

OMAR H. SMITH.
PAUL G. ROACH.

REFERENCES CITED

The following references are of record in the file of this patent:

UNITED STATES PATENTS

| Number | Name | Date |
|---|---|---|
| 2,205,449 | Wiley | June 25, 1940 |
| 2,371,868 | Berg | Mar. 20, 1945 |

FOREIGN PATENTS

| Number | Country | Date |
|---|---|---|
| 539,785 | Great Britain | Sept. 24, 1941 |